(12) United States Patent
Blackburn et al.

(10) Patent No.: US 8,658,978 B2
(45) Date of Patent: Feb. 25, 2014

(54) METHODS AND APPARATUS FOR A RADIATION MONITOR

(75) Inventors: Brandon W. Blackburn, Idaho Falls, ID (US); Kevin Perry, Beverly, MA (US)

(73) Assignee: Raytheon Company, Waltham, MA (US)

( * ) Notice: Subject to any disclaimer, the term of this patent is extended or adjusted under 35 U.S.C. 154(b) by 231 days.

(21) Appl. No.: 13/339,679

(22) Filed: Dec. 29, 2011

(65) Prior Publication Data
US 2013/0168556 A1 Jul. 4, 2013

(51) Int. Cl.
*G01T 1/202* (2006.01)

(52) U.S. Cl.
USPC .......................................... 250/362

(58) Field of Classification Search
USPC .......................................... 250/362
See application file for complete search history.

(56) References Cited

U.S. PATENT DOCUMENTS

| | | | |
|---|---|---|---|
| 4,447,734 A | 5/1984 | Kusumegi et al. | |
| 4,649,015 A | 3/1987 | DeVolpi | |
| 4,835,391 A | 5/1989 | Hartemann et al. | |
| 5,168,540 A | 12/1992 | Winn et al. | |
| 5,367,168 A | 11/1994 | Berthold et al. | |
| 6,518,580 B1 * | 2/2003 | van Bibber et al. | 250/397 |
| 6,531,816 B1 | 3/2003 | Breskin | |
| 6,674,063 B2 | 1/2004 | Ferenc | |
| 6,791,269 B1 | 9/2004 | Popov | |
| 7,154,097 B2 | 12/2006 | Fontbonne et al. | |
| 7,453,987 B1 | 11/2008 | Richardson | |
| 7,485,872 B2 | 2/2009 | Frisch et al. | |
| 7,601,965 B1 | 10/2009 | Bell et al. | |
| 7,629,588 B1 | 12/2009 | Bell et al. | |
| 7,642,520 B2 | 1/2010 | Uematsu et al. | |
| 7,663,123 B2 | 2/2010 | Fleming et al. | |
| 7,842,930 B2 | 11/2010 | Almogy et al. | |
| 7,872,750 B1 | 1/2011 | Wrbanek et al. | |
| 7,897,925 B2 | 3/2011 | Goldberg et al. | |
| 7,952,075 B2 * | 5/2011 | Bell et al. | 250/361 R |
| 8,044,357 B2 | 10/2011 | Ishikawa | |

OTHER PUBLICATIONS

Carl et al., Beam test of a dual radiator Cherenkov detector with aerogel and wavelength-shifting acrylic plastic, 2004, Nuclear Instrument and methods in Physics Research, vol. 527, pp. 301-307.*
Cremaldi et al., A Cherenkov Radiation Detector with High Density Aerogels, Jun. 2009, IEEE Transactiosn on Nuclear Science, vol. X, pp. 1-4.*
Higinbotham, D.W., Diffusely reflective aerogel Cherenkov detector simulation techniques, 1998, Nuclear Instruments and Methods in Physics Research A, vol. 414, pp. 332-339.*
Allkofer et al., A new aerogel Cerenkov detector with wavelength shifter, Mar. 30, 2007, pp. 1-13.*

(Continued)

*Primary Examiner* — Christine Sung
(74) *Attorney, Agent, or Firm* — Daly, Crowley, Mofford & Durkee, LLP

(57) ABSTRACT

Methods and apparatus for a radiation monitor. In one embodiment, a radiator monitor comprises a housing, a detector material having an adjustable density in the housing, an optical coupler adjacent the detector material to receive Cherenkov energy generated in the detector material, a photodetector coupled to the optical coupler, and a processing module coupled to the photodetector to determine whether a detection threshold is exceeded.

16 Claims, 4 Drawing Sheets

(56) References Cited

OTHER PUBLICATIONS

Iijima et al., Aerogel Cherenkov counter for the BELLE detector, 2000, Nuclear Instruments and Methods in Physics Research A, vol. 453, pp. 321-325.*

Sumiyoshi et al., Silica aerogel Cherenkov counter for the KEK B-factory experiment, 1999, Nuclear Instruments and Methods in Physics Research A, vol. 433, pp. 385-391.*

Lu et al., Helium gas mixtures for ring imaging Cherenkov detectors with CsI photocathodes, 1993, Nuclear Instruments and Methods in Physics Research A, vol. 334, pp. 328-338.*

* cited by examiner

METHODS AND APPARATUS FOR A RADIATION MONITOR

BACKGROUND

As is known in the art, it is desirable to know when stray radiation is present. Conventional radiation monitors, e.g., beam loss monitors (BLMs), are very expensive, are relatively slow in detecting radiation, require high voltage power, and have high bias voltages, e.g., greater than 1000V.

One type of known detector requires a conventional detector material coupled to photomultipliers (PMTs). The response time of PMT-based BLMs is in the order of 0.1 μs to 1 μs. In addition, PTMs are relatively fragile and prone to gain shifts with changes in temperature.

Another known detector is referred to as a scintillation counter that measures ionizing radiation. The scintillator includes a transparent crystal, such as phosphor, a plastic, typically containing anthracene, or an organic liquid that fluoresces when struck by ionizing radiation. A photomultiplier tube (PMT) attached to an amplifier measures the light from the crystal. However, such devices may require the use of toxic materials and are relatively slow.

In addition, known BLMs are prone to false alarms. For example, some locations have relatively high levels of natural radiation. These radiation levels can trigger the BLM resulting in false alarms. As will be readily appreciated, false alarms are undesirable since complex and costly equipment must be ungracefully shut down, which can have significant adverse consequences.

SUMMARY

In one aspect of the invention, a radiator monitor comprises a housing, a detector material having an adjustable density in the housing to select a detection threshold for radiation, an optical coupler adjacent the detector material to receive Cherenkov energy generated in the detector material, a photodetector coupled to the optical coupler, and a processing module coupled to the photodetector to determine whether the detection threshold is exceeded.

The radiation monitor can further include one or more of the following features: the housing has an adjustable volume, a reflective material about an outer surface of the housing, the housing is generally cylindrical, the detector material comprises an aerogel, the photodetector comprises a photodiode, the photodetector comprises a photomultiplier, the detection threshold ranges from about 0.25 to about 30 MeV, the housing has an adjustable shape to adjust the density of the detector material, and/or a supply coupled to the housing to adjust the density of the detector material.

In another aspect of the invention, a method comprises providing a detector material in a housing, and adjusting a density of the detector material to a selected detection threshold for Cherenkov energy generated in the detector material.

The method can further include one or more of the following features: changing a volume of the housing, employing a photodetector coupled to an optical coupler and a processing module coupled to the photodetector to determine whether the detection threshold is exceeded, employing a reflective material about an outer surface of the housing, the detector material comprises an aerogel, and/or adjusting an amount of the detector material in the housing to adjust the density.

In a further aspect of the invention, a system comprises a structure, a particle accelerator in the structure, and a radiator monitor, comprising: a housing, a detector material having an adjustable density in the housing, an optical coupler adjacent the liquid to receive Cherenkov energy generated in the detector material, a photodetector coupled to the optical coupler, and a processing module coupled to the photodetector to determine whether a detection threshold is exceeded.

The system can further include a reflective material about an outer surface of the housing, the detector material comprises an aerogel, and/or a volume of the housing is adjustable.

BRIEF DESCRIPTION OF THE DRAWINGS

The foregoing features of this invention, as well as the invention itself, may be more fully understood from the following description of the drawings in which:

FIG. 1A is a schematic representation of an exemplary radiation monitor having an adjustable volume in accordance with exemplary embodiments of the invention;

DETAILED DESCRIPTION

Figure 1:
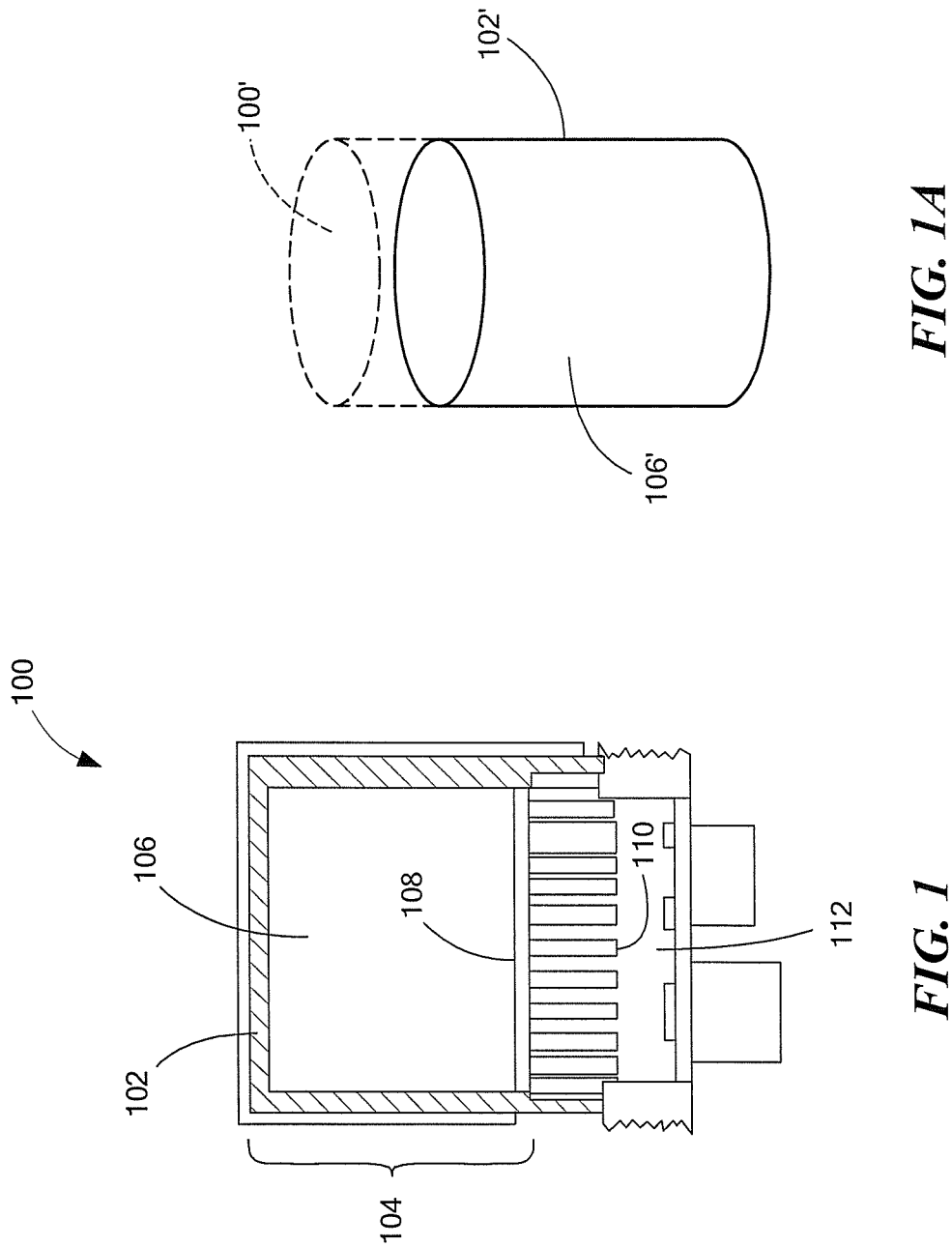
FIG. 1 is a schematic representation of an exemplary radiation monitor in accordance with exemplary embodiments of the invention.

FIG. 1 shows an exemplary radiation monitor 100 in accordance with exemplary embodiments of the invention. The radiation monitor 100 includes a housing 102 containing a radiation detector 104, such as a Cherenkov detector. In one embodiment, the Cherenkov detector 104 comprises a detection material 106 contained in the housing 102 and an optical coupler 108 adjacent a photodetector 110 for converting light into current or voltage.

As is known in the art, Cherenkov radiation is electromagnetic radiation emitted when a charged particle, such as an electron, passes through a dielectric medium at a speed greater than the phase velocity of light in that medium. The charged particles polarize the molecules of that medium, which then turn back rapidly to their ground state, emitting radiation in the process.

In an exemplary embodiment, the detection material 106 for the Cherenkov detector comprises an adjustable density material, such as an aerogel, to select a desired radiation threshold level, i.e., energy level. In one embodiment, the detection material 106 comprises an aerogel having a density that is adjusted by adding a fixed amount of material into an adjustable volume. Density is adjusted by varying the active volume of the housing, for example, by screwing in or out a threaded and sealed housing. Since the housing is filled with a fixed amount of material, the density of that material changes with changes in volume. By adjusting the density of the aerogel, the energy of radiation detected is modified to achieve a selected level.

A processing module 112 receives information from the photodetector 110 and determines if the threshold detection has been exceeded. If so, an alarm signal is generated to initiate shutdown of the beam generator. In one embodiment, the processing module 112 comprises a programmable device, such as a Field Programmable Gate Array (FPGA). It is understood that a variety of hardware and software implementations are possible without departing from the scope of the present invention.

In one embodiment, the photodetector 110 comprises a photodiode. In another embodiment, the photodetector comprises a silicon-based photomultiplier. In general, photodiodes and/or silicon-based PMTs are suitable because of their relatively fast (ns) response times. It is understood that other photodetectors can be used to meet the needs of a particular application.

In one embodiment, the response time of the radiation monitor is less than 10 ns. For example, Cherenkov energy generation is in the order of picoseconds, photodetector e.g., photodiode, response is in the order of about 2 ns, and processing module operation would be in the order of about 2 ns, the total of which is well below 10 ns. It will be readily appreciated that rapid radiation detection is extremely desirable to protect people, valuable equipment, and the surrounding location in general.

In one embodiment, the detection material comprises an aerogel. As is known in the art, an aerogel derived from a gel in which the liquid component of the gel has been replaced with a gas resulting is an extremely low-density solid. Aerogels are produced by extracting the liquid component of a gel through supercritical drying, for example, in which the liquid is slowly drawn off without causing the solid matrix in the gel to collapse.

In one embodiment, a carbon aerogel is used. Pure carbon (mixture of C-11 and C-12) does not result in long-lived radioactive isotopes when exposed to high radiation fields of either photons or neutrons. Other materials might become radioactive if exposed to fields for a long time.

It is understood that the geometry of the inventive detector and components can vary to meet the requirements of a particular application. In one embodiment, an exemplary radiation detector fits inside a 10 cm per side cube.

While exemplary embodiments of the invention are shown in conjunction with a cylindrical housing, it is understood that other shapes can be used to contain the detection fluid. In other embodiments, the geometry of the housing can be modified to adjust the detection threshold. For example, a sealed cylindrical housing 102' can be elongated or shortened to adjust the threshold, as shown in FIG. 1A. For example, for a gaseous detection material 106', altering the volume containing the detection material modifies the density, and therefore, the detection threshold of the detection material.

Figure 2:
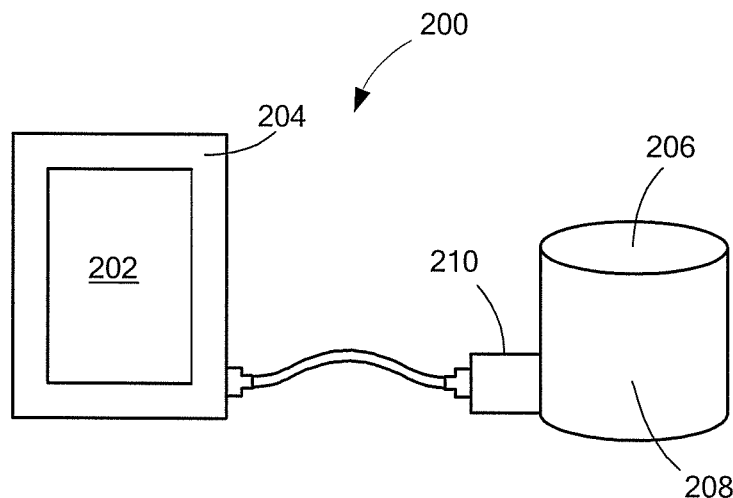
FIG. 2 is a schematic representation of an exemplary radiation monitor having a dynamically adjustable detection threshold in accordance with exemplary embodiments of the invention.

FIG. 2 shows an exemplary detector 200 having a detection material 202 in a housing 204 in fluid communication with a container 206 containing a material 208 for adjusting a density of the detection material 202. In one embodiment, the container 206 is coupled to a regulator system 210 to control the flow of fluid 208 from the container to the housing 204. In one embodiment, the detection material 202 comprises an aerogel and the material 208 comprises air.

Cherenkov radiation requires that the velocity of a particle in a medium be faster than the speed of light in the medium:

$$V_p > c/n, \ \beta_p = V_p/c, \text{ and } \beta_p > 1/n \tag{1},$$

where, $V_p$ is the speed of a particle in the media, c is the speed of light, n is the index of refraction for the media, and $\beta_p$ is the ratio of $V_p$ to c. The energy of the particle can be related to its speed, and therefore $\beta_p$, using relativistic relations:

$$\gamma = \frac{1}{\sqrt{1-\beta_p^2}} \tag{2}$$

$$E_p = \gamma m_0 c^2, \tag{3}$$

where $E_p$ is the energy of a particle in MeV and $m_0 c^2$ is the rest mass of a particle in MeV.

By expressing $\beta_p$ in terms of $E_p$ and the rest mass of the particle, and making this subject to the conditional Cherenkov condition in Equation (1), an expression of how the threshold energy changes with the index of refraction ($m_0 c^2$ for an electron is 0.511 MeV) is set forth below:

$$E_p > \frac{m_0 c^2}{\sqrt{1-\frac{1}{n^2}}}, \tag{4}$$

It is understood that a variety of materials having a selected threshold energy for electrons (and protons) can be used for the detection material to meet the needs of a particular application. The threshold energy is set forth below for the listed materials.

Helium at STP (standard temperature and pressure) (n=1.000036); threshold energy is 60.2 MeV Hydrogen at STP (n=1.000140); threshold energy is 30.5 MeV Air at STP (n=1.00029); threshold energy is 21.2 MeV Aerogel has a variable index of refraction which depends on density ρ through the relationship $n^2=1+\alpha\rho$, where α is the dipole polarization of molecules in the medium. For a given material alpha is fixed so that the index of refraction is proportional to the square root of density ρ. Since aerogels can be made of variable density, indices of refraction from 1.0026 to 1.26 can be achieved, which corresponds to threshold energies from (839 keV to 7.1 MeV)

Other materials for the threshold Cherenkov detectors will be readily apparent to one of ordinary skill in the art. In addition, aerogel is an exemplary material that can be made to have a range of densities resulting in a range of energy thresholds. Further, aerogels can be formed from a wide range of materials and techniques well known in the art. It is understood that for higher energy applications materials having higher energy thresholds, such as air and helium, are contemplated.

Figure 3:
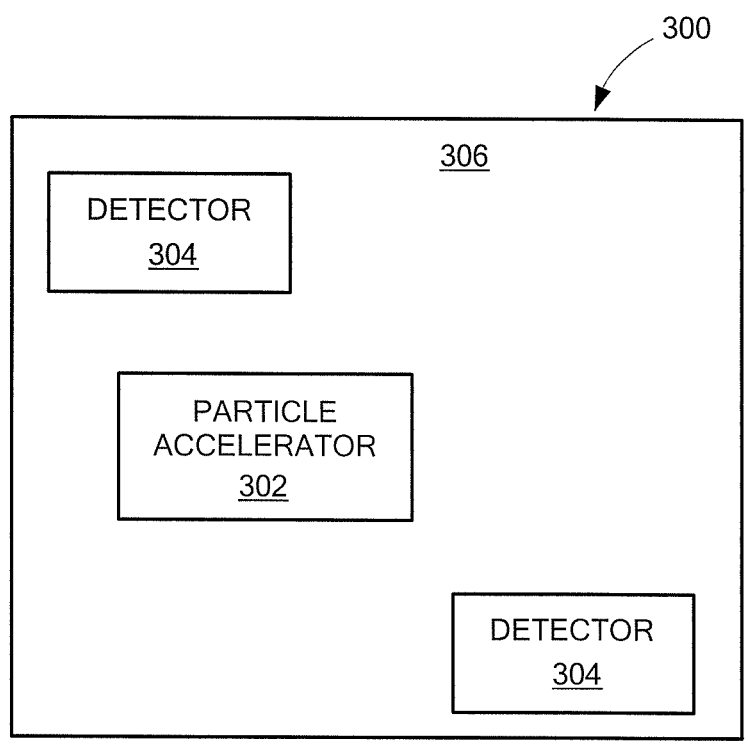
FIG. 3 is a block diagram of an exemplary system generating ionizing radiation and having radiation detectors in accordance with exemplary embodiments of the invention.

Exemplary applications include accelerator beam laboratories, satellites, hospitals, etc., where ionizing radiation is produced. FIG. 3 shows an exemplary environment 300 having a generator of ionizing radiation 302 and radiation detectors 304 to detect stray radiation above a selected threshold. In general, a particle accelerator 302 can be housed in a structure 306, such as a building. Any practical number of detectors 304, such as the detector 100 of FIG. 1, can be placed about the structure to detect stray radiation and generate alerts in a desired manner.

Figure 4:
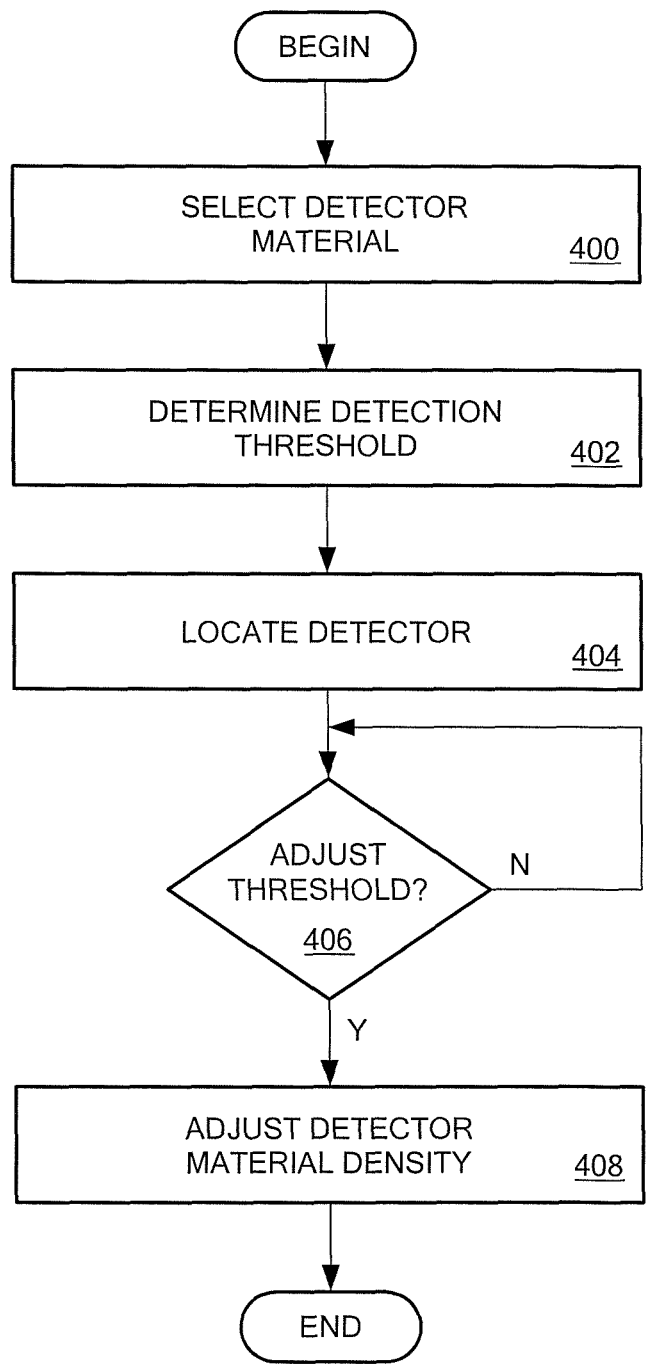
FIG. 4 is a flow diagram showing an exemplary sequence of steps for providing a radiation detector in accordance with exemplary embodiments of the invention.

FIG. 4 shows an exemplary sequence of steps for implementing a radiation detector having an adjustable threshold in accordance with exemplary embodiments of the invention. In step 400, a detector material is selected that is suitable for the energy level of the application. In step 402, a detection threshold is selected for the detector. In general, the threshold should be sufficiently high so as to minimize false detections and sufficiently low so as to detect stray radiation as quickly and reliably as possible.

In step 404, the inventive detector is located in proximity to a radiation generator to detect stray radiation. It is understood that any practical number of detectors can be used at a variety of locations strategically selected to detect stray radiation greater than the given threshold. In step 406, it is determined whether the detection threshold should be adjusted. For example, in response to false alarms, it may be desirable to raise the detection threshold. If so, in step 408 the threshold is adjusted, such as by modifying the density of the detector material.

It is understood that radiation detectors in accordance with exemplary embodiments of the invention have wide variety of applications, such as particle accelerator facilities, nuclear medicine equipment, and the like.

In one embodiment, the detector can be used to sense and detect directed energy weapons. For example, a detector can detect the use of laser energy. In another embodiment, an inventive detector can detect radiation interrogation of an item or person.

Figure 5:
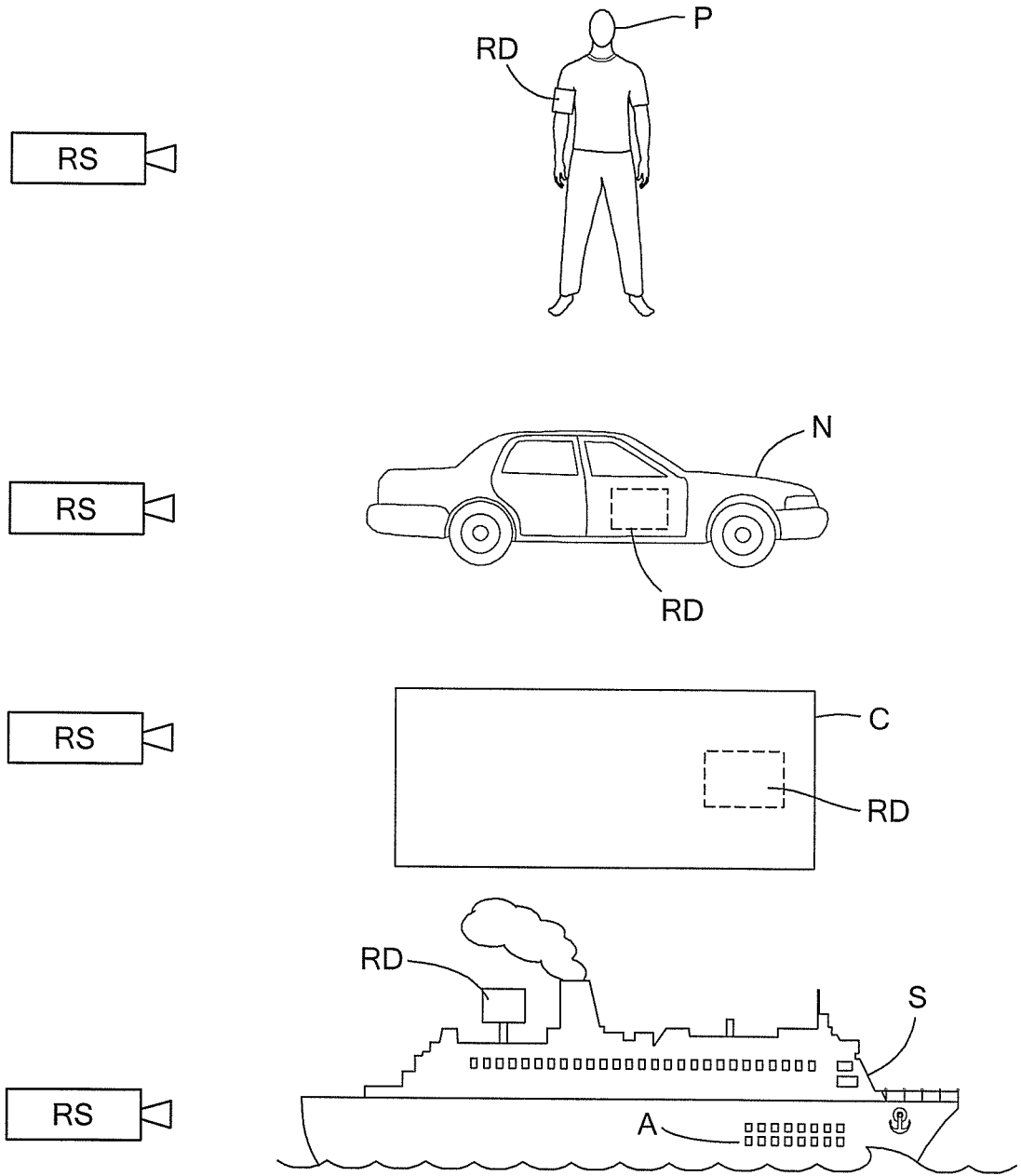
FIG. 5 is a schematic representation of an exemplary radiation detector environment.

FIG. 5 shows an exemplary environment in which a radiation detector RD is used to detect radiation from a radiation source RS. For example, it may be desirable to know that radiation interrogation is occurring. Exemplary objects of radiation interrogation include a person P, a vehicle V, a container C, and a ship S. The respective radiation detector RD can detect the presence of ionizing radiation. In one embodiment, the radiation detector continuously changes a detection threshold to detect various radiation types and levels. In another embodiment, an array A of radiation detectors having static and/or dynamic thresholds can be used.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A radiator monitor, comprising:
   a housing;
   a detector material having an adjustable density in the housing to select a detection threshold for radiation, wherein the detector material comprises an aerogel;
   an optical coupler adjacent the detector material to receive Cherenkov energy generated in the detector material;
   a photodetector coupled to the optical coupler; and
   a processing module coupled to the photodetector to determine whether the detection threshold is exceeded.

2. The monitor according to claim 1, wherein the housing has an adjustable volume.

3. The monitor according to claim 1, further including a reflective material about an outer surface of the housing.

4. The monitor according to claim 1, wherein the housing is generally cylindrical.

5. The monitor according to claim 1, wherein the photodetector comprises a photodiode.

6. The monitor according to claim 1, wherein the photodetector comprises a photomultiplier.

7. The monitor according to claim 1, wherein the detection threshold ranges from about 0.25 to about 30 MeV.

8. The monitor according to claim 1, wherein the housing has an adjustable shape to adjust the density of the detector material.

9. The monitor according to claim 1, further including a supply coupled to the housing to adjust the density of the detector material.

10. A method, comprising:
    providing a detector material in a housing, wherein the detector material comprises an aerogel; and
    adjusting a density of the detector material to a selected detection threshold for Cherenkov energy generated in the detector material; and
    employing a photodetector coupled to an optical coupler and a processing module coupled to the photodetector to determine whether the detection threshold is exceeded.

11. The method according to claim 10, further including changing a volume of the housing.

12. The method according to claim 10, further including employing a reflective material about an outer surface of the housing.

13. The method according to claim 10, further adjusting an amount of the detector material in the housing to adjust the density.

14. A system, comprising:
    a structure;
    a particle accelerator in the structure; and
    a radiator monitor, comprising:
      a housing;
      a detector material having an adjustable density in the housing, wherein the detector material comprises an aerogel;
      an optical coupler adjacent the detector material to receive Cherenkov energy generated in the detector material;
      a photodetector coupled to the optical coupler; and
      a processing module coupled to the photodetector to determine whether a detection threshold is exceeded.

15. The system according to claim 14, further including a reflective material about an outer surface of the housing.

16. The system according to claim 14, wherein a volume of the housing is adjustable.

* * * * *